(12) United States Patent
Kagawa et al.

(10) Patent No.: US 10,297,877 B2
(45) Date of Patent: May 21, 2019

(54) STORAGE BATTERY CONTROL DEVICE AND STORAGE BATTERY CONTROL METHOD

(71) Applicant: Kabushiki Kaisha Toshiba, Tokyo (JP)

(72) Inventors: Yuki Kagawa, Tokyo (JP); Taichi Isogai, Tokyo (JP); Ryo Yano, Tokyo (JP); Yoshimasa Tada, Tokyo (JP); Nobuaki Sano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/776,348

(22) PCT Filed: Mar. 16, 2015

(86) PCT No.: PCT/JP2015/057741
§ 371 (c)(1),
(2) Date: Sep. 14, 2015

(87) PCT Pub. No.: WO2016/147302
PCT Pub. Date: Sep. 22, 2016

(65) Prior Publication Data
US 2017/0373355 A1   Dec. 28, 2017

(51) Int. Cl.
*H01M 10/48* (2006.01)
*H02J 3/32* (2006.01)
(Continued)

(52) U.S. Cl.
CPC ............. *H01M 10/482* (2013.01); *H02J 3/32* (2013.01); *H02J 7/0013* (2013.01);
(Continued)

(58) Field of Classification Search
CPC ................................ H01M 10/482; H02J 3/32
(Continued)

(56) References Cited

U.S. PATENT DOCUMENTS 6,847,127 B1   1/2005 Lee
2004/0263119 A1   12/2004 Meyer et al.
(Continued)

FOREIGN PATENT DOCUMENTS

EP   2463981 A1   6/2012
JP   2000-306613 A   11/2000
(Continued)

OTHER PUBLICATIONS

Office Action issued in related Korean Application No. 10-2015-7035488, dated Sep. 13, 2016 (15 pages).
(Continued)

*Primary Examiner* — Abdullah A Riyami
*Assistant Examiner* — Nader J Alhawamdeh
(74) *Attorney, Agent, or Firm* — Baker Botts L.L.P.

(57) ABSTRACT

According to one embodiment, a storage battery control device includes a first reception unit, a second reception unit, a calculation unit, a generation unit, and a transmission unit. The first reception unit receives a charge and discharge command from a power management device. The second reception unit receives a current electricity storage state from each of storage batteries. The calculation unit calculates a control amount, which indicates a ratio of the current electricity storage state in an operation range, with respect to each of the storage batteries on the basis of the current electricity storage state and the operation range of the electricity storage state. The generation unit generates a charge and discharge output value, which is an output value of charge and discharge for the each of the storage batteries, on the basis of the control amount and the charge and discharge command, the control amount calculated for each of the storage batteries, the charge and discharge command received by the first reception unit. The transmission unit transmits the charge and discharge output value to each of
(Continued)

the storage batteries, the charge and discharge output value generated by the generation unit.

10 Claims, 13 Drawing Sheets

(51) Int. Cl.
*H02J 7/00* (2006.01)
*H01M 10/44* (2006.01)

(52) U.S. Cl.
CPC .......... *H02J 7/0021* (2013.01); *H02J 7/0078* (2013.01); *H01M 10/441* (2013.01); *H02J 2007/0096* (2013.01)

(58) Field of Classification Search
USPC .......................................... 429/90
See application file for complete search history.

(56) References Cited

U.S. PATENT DOCUMENTS

| | | | |
|---|---|---|---|
| 2010/0096918 A1 | 4/2010 | Sawada et al. | |
| 2010/0188048 A1* | 7/2010 | Nishino | H01M 2/166 320/120 |
| 2012/0133333 A1 | 5/2012 | Morioka et al. | |
| 2013/0280560 A1* | 10/2013 | Lim | H01M 2/34 429/49 |
| 2013/0300374 A1 | 11/2013 | Tomita et al. | |
| 2014/0177145 A1 | 6/2014 | Kawahara et al. | |
| 2015/0002102 A1* | 1/2015 | Ohashi | H01M 10/441 320/135 |
| 2015/0005998 A1 | 1/2015 | Choi et al. | |
| 2015/0318582 A1* | 11/2015 | Brockman | G01R 31/3606 320/137 |
| 2016/0020613 A1 | 1/2016 | Kimura et al. | |
| 2016/0126741 A1* | 5/2016 | Ito | H02J 1/102 307/82 |
| 2016/0226250 A1* | 8/2016 | Fukubayashi | H02J 3/32 |
| 2017/0126043 A1* | 5/2017 | Yoshida | H02J 7/0063 |
| 2017/0221161 A1* | 8/2017 | Kudo | G06Q 50/01 |
| 2017/0373355 A1* | 12/2017 | Kagawa | H01M 10/482 |

FOREIGN PATENT DOCUMENTS

| | | |
|---|---|---|
| JP | 2013-106372 A | 5/2013 |
| JP | 2013-169089 A | 8/2013 |
| JP | 5590033 B | 9/2014 |
| JP | 2014-233096 A | 12/2014 |
| JP | 2014-233098 A | 12/2014 |
| JP | 2014-236561 | 12/2014 |
| JP | 2015009802 A | 1/2015 |
| KR | 10-2004-0001776 A | 1/2004 |
| KR | 10-1025896 B1 | 3/2011 |
| WO | 2011/016273 A1 | 2/2011 |
| WO | 2013/046657 A1 | 4/2013 |

OTHER PUBLICATIONS

International Search Report issued in related PCT Application No. PCT/JP2015/057741 dated Jun. 2, 2015, 3 pages.

* cited by examiner

FIG.3

| STORAGE BATTERY IDENTIFICATION INFORMATION | CURRENT SOC | SOC OPERATION RANGE | TOTAL CAPACITY | STORAGE BATTERY OPERATION RANGE | CONTROL SOC |
|---|---|---|---|---|---|
| STORAGE BATTERY A | 20% | 0% TO 40% | 200kWh | 0kWh TO 80kWh | |
| STORAGE BATTERY B | 30% | 20% TO 60% | 200kWh | 40kWh TO 120kWh | |
| STORAGE BATTERY C | 60% | 60% TO 100% | 300kWh | 180kWh TO 300kWh | |

| STORAGE BATTERY IDENTIFICATION INFORMATION | CURRENT SOC | SOC OPERATION RANGE | TOTAL CAPACITY | STORAGE BATTERY OPERATION RANGE | CONTROL SOC |
|---|---|---|---|---|---|
| STORAGE BATTERY A | 20% | 0% TO 40% | 200kWh | 0kWh TO 80kWh | 50% |
| STORAGE BATTERY B | 30% | 20% TO 60% | 200kWh | 40kWh TO 120kWh | 25% |
| STORAGE BATTERY C | 60% | 60% TO 100% | 300kWh | 180kWh TO 300kWh | 0% |
| ... | ... | ... | ... | ... | ... |

| STORAGE BATTERY IDENTIFICATION INFORMATION | CURRENT SOC | SOC OPERATION RANGE | TOTAL CAPACITY | STORAGE BATTERY OPERATION RANGE | CONTROL SOC |
|---|---|---|---|---|---|
| STORAGE BATTERY A | 40% | 0% TO 40% | 200kWh | 0kWh TO 80kWh | 100% |
| STORAGE BATTERY B | 40% | 20% TO 60% | 200kWh | 40kWh TO 120kWh | 50% |
| STORAGE BATTERY C | 60% | 60% TO 100% | 300kWh | 180kWh TO 300kWh | 0% |
| ... | ... | ... | ... | ... | ... |

| STORAGE BATTERY | CURRENT SOC | SOC OPERA-TION RANGE | TOTAL CAPACITY | STORAGE BATTERY OPERATION RANGE | CONTROL SOC |
|---|---|---|---|---|---|
| STORAGE BATTERY A | 20% | (1) 0% TO 40% | 200kWh | 0kWh TO 80kWh | |
| | | (2) 20% TO 60% | | 40kWh TO 120kWh | |
| | | (3) 30% TO 70% | | 60kWh TO 140kWh | |
| STORAGE BATTERY B | 30% | (1) 20% TO 60% | 200kWh | 40kWh TO 120kWh | |
| | | (2) 10% TO 50% | | 20kWh TO 100kWh | |
| | | (3) 40% TO 80% | | 80kWh TO 160kWh | |
| STORAGE BATTERY C | 60% | 60% TO 100% | 300kWh | 180kWh TO 300kWh | |
| ... | ... | ... | ... | ... | ... |

(b)

| STORAGE BATTERY | CURRENT SOC | SOC OPERA-TION RANGE | TOTAL CAPACITY | STORAGE BATTERY OPERATION RANGE | CONTROL SOC |
|---|---|---|---|---|---|
| STORAGE BATTERY A | 20% | (1) 0% TO 40% | 200kWh | 0kWh TO 80kWh | 50% |
| | | (2) 10% TO 50% | | 20kWh TO 100kWh | 25% |
| | | (3) 30% TO 70% | | 60kWh TO 140kWh | 0% |
| STORAGE BATTERY B | 30% | (1) 20% TO 60% | 200kWh | 40kWh TO 120kWh | 25% |
| | | (2) 10% TO 50% | | 20kWh TO 100kWh | 50% |
| | | (3) 40% TO 80% | | 80kWh TO 160kWh | 0% |
| STORAGE BATTERY C | 60% | 60% TO 100% | 300kWh | 180kWh TO 300kWh | 0% |
| ... | ... | ... | ... | ... | ... |

| SOC | CHARGE AND DISCHARGE EFFICIENCY |
|---|---|
| 10% | nn% |
| 20% | xx% |
| ... | ... |

STORAGE BATTERY CONTROL DEVICE AND STORAGE BATTERY CONTROL METHOD

CROSS-REFERENCE TO RELATED APPLICATIONS

This application is national stage application of International Application No. PCT/JP2015/057741, filed Mar. 16, 2015, which designates the United States, the entire contents of which are incorporated herein by reference.

FIELD

Embodiments described herein relate generally to a storage battery control device, and a storage battery control method.

BACKGROUND

Recently, natural energy such as sunlight power generation and wind power generation has been introduced in an active manner, and the natural energy has been utilized even by general customers by installation of a solar panel. A power generation apparatus using the natural energy depends on a meteorological phenomenon, weather, and the like, and thus there is a case where a power system may be unstable.

To solve instability relating to the power system, there is known a technology in which a storage battery is connected to the power system, and a variation in power generation due to natural energy and the like is compensated through output adjustment by charging or discharging of the storage battery. As this technology, for example, a load frequency control (LFC), in which output adjustment in accordance with the demand for electric power is known. In LFC, a raising command for instruction of an increase in an output, and a lowering command for instruction of a decrease in the output are transmitted to an electric power generator, thereby constantly maintaining a frequency of a system, and a link line power flow.

Typically, in LFC, the raising command and the lowering command are controlled to be entirely uniform. However, in the case of transmitting the command for output adjustment in LFC to the storage battery, even when the raising command and the lowering command are set to the same amount, the power storage residual amount of the storage battery decreases due to a charge and discharge loss in the storage battery, and thus, finally, it is difficult to cope with the raising command (discharge command for the storage battery). In addition, in contrast, even in a case where an amount of charge and an amount of discharge are set to the same as each other through the whole, a command value is inclined to a charge direction at a certain time zone, and thus charge is carried out to the capacity upper limit of the storage battery, and a chargeable electric power amount may be zero.

In this regard, in the related art, there is known a technology in which an operation range, which is a dynamic range of state of charge (SOC) for each storage battery, is limited, and charge and discharge of the storage battery are controlled in the operation range of SOC, or storage battery information including a charge performance and a battery residual amount of a plurality of storage batteries is acquired for a constant time interval, and the charge and discharge are controlled on the basis of the storage battery information.

However, in the related art, in a case simultaneously operating storage batteries in which operation ranges of SOC are different from each other, it is necessary to examine a process or a rule in accordance with the respective operation ranges, and thus application to a system, in which a large number of storage batteries are necessary, is difficult, and thus inefficient operation may be carried out.

BRIEF DESCRIPTION OF DRAWINGS

FIG. 3 is a diagram illustrating an example of a storage battery DB according to the first embodiment;

FIG. 12 is a diagram illustrating an example of a storage battery DB according to the third embodiment;

DETAILED DESCRIPTION

In general, according to an embodiment, a storage battery control device comprises a first reception unit, a second reception unit, a calculation unit, a generation unit, and a transmission unit. The first reception unit receives a charge and discharge command from a power management device. The second reception unit receives a current electricity storage state from each of storage batteries. The calculation unit calculates a control amount, which indicates a ratio of the current electricity storage state in an operation range, with respect to each of the storage batteries on the basis of the current electricity storage state and the operation range of the electricity storage state. The generation unit generates a charge and discharge output value, which is an output value of charge and discharge for the each of the storage batteries, on the basis of the control amount and the charge and discharge command, the control amount calculated for each of the storage batteries, the charge and discharge command received by the first reception unit. The transmission unit transmits the charge and discharge output value to each of the storage batteries, the charge and discharge output value generated by the generation unit.

Hereinafter, embodiments will be described with reference to the accompanying drawings.

First Embodiment

Figure 1:
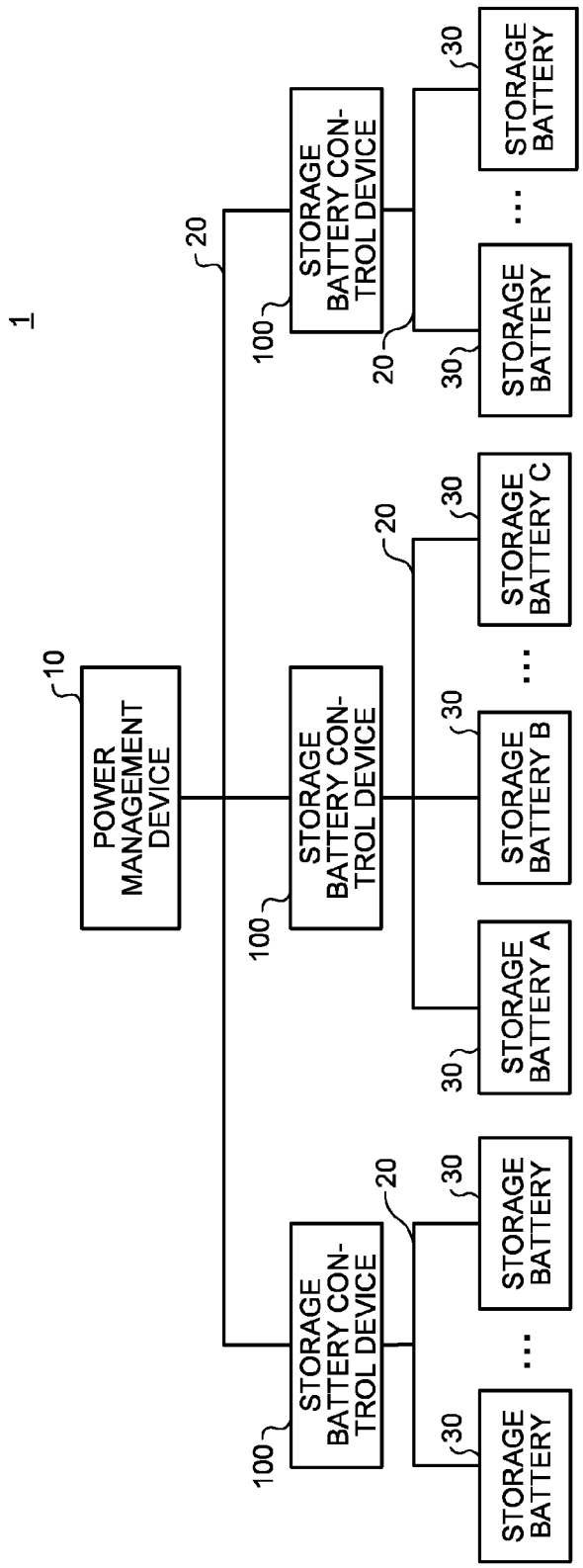
FIG. 1 is a diagram illustrating an example of an entire configuration of a storage battery control system according to a first embodiment.

FIG. 1 is a diagram illustrating an example of an entire configuration of a storage battery control system according to a first embodiment. As illustrated in FIG. 1, a storage battery control system 1 according to this embodiment includes a configuration in which a power management device 10, a plurality of storage battery control devices 100, and a plurality of storage batteries 30 are connected to a power system 20. The plurality of storage batteries 30, which are control targets, are connected to one storage battery control device 100. On the other hand, a thermoelectric power plant, a hydroelectric power plant, and the like are also connected to the power system 20, but these plants and the like are not illustrated in the diagram of FIG. 1.

The power management device 10 is a device that manages stabilization of the power system 20. The power management device 10 is embedded, for example, in a computer and the like which are installed in a central power feed command center and the like. The power management device 10 transmits a charge and discharge command, which indicates an amount of charge and discharge power of a storage battery to each of the storage battery control devices 100. The charge and discharge command is also referred to as an upper-layer command.

Here, examples of the charge and discharge command include a discharge command (raising command) and a charge command (lowering command). The discharge command is a command including an instruction for an increase in an output, that is, an instruction for discharge of the storage batteries 30, and an amount of discharge power. The charge command is a command including an instruction for a decrease in an output, that is, an instruction for charge of the storage batteries 30, and an amount of charge power. Here, the amount of discharge power, and the amount of charge power are collectively called an amount of charge and discharge power.

Each of the plurality of storage batteries 30 is formed by connecting a plurality of cells including an electrode and an electrolyte. For example, the respective storage batteries 30 can be configured as a lithium ion storage battery, a lead storage battery, a nickel-hydrogen storage battery, a sodium-sulfur storage battery, and the like, but there is no limitation thereto. In addition, the respective storage batteries 30 may include a sensor that detects an electricity storage state (SOC) indicating an amount of charge, and the like.

Figure 2:
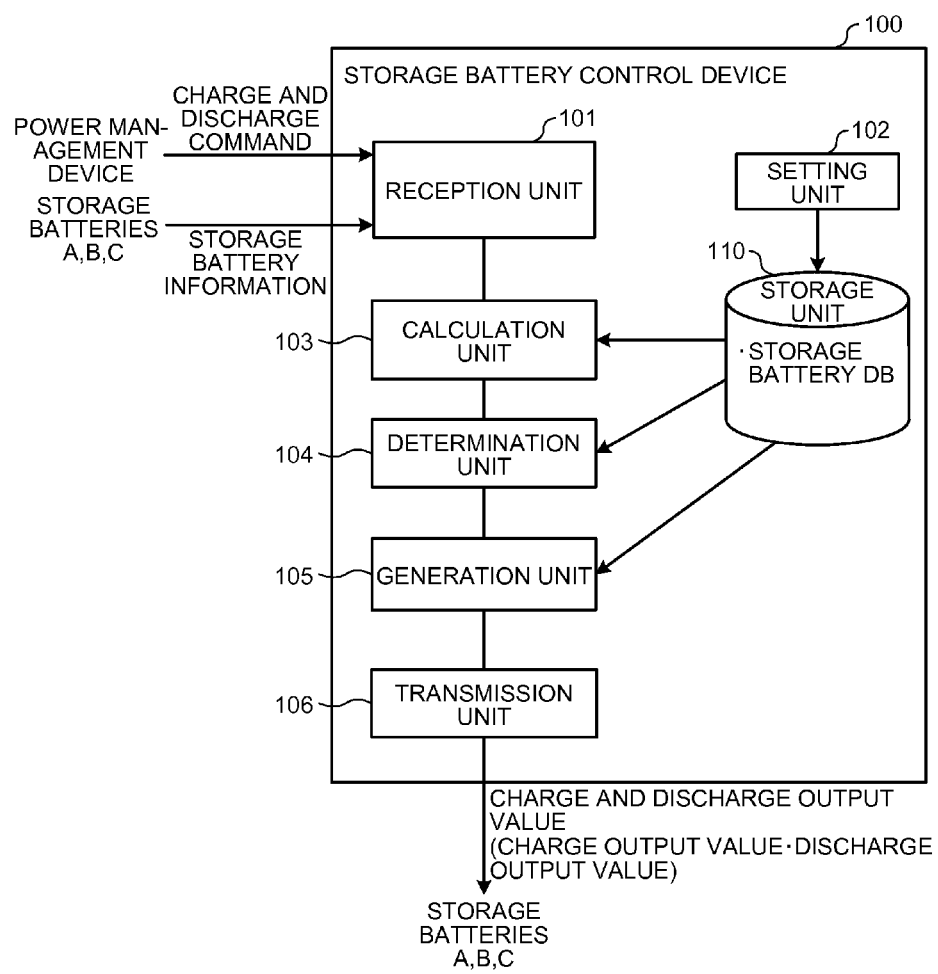
FIG. 2 is a block diagram illustrating an example of a functional configuration of a storage battery control device 100 according to the first embodiment.

The storage battery control device 100 manages an amount of charge of each of the storage batteries 30 by controlling the charge and discharge of one or the plurality of the storage batteries 30 which are control targets. FIG. 2 is a block diagram illustrating an example of a functional configuration of the storage battery control device 100 according to the first embodiment. As illustrated in FIG. 2, the storage battery control device 100 according to this embodiment mainly includes a reception unit 101, a setting unit 102, a calculation unit 103, a determination unit 104, a generation unit 105, a transmission unit 106, and a storage unit 110.

The reception unit 101 receives a charge and discharge command from the power management device 10. In addition, the reception unit 101 receives storage battery information from each of the storage batteries 30. Here, the storage battery information is data including a current electricity storage state (SOC). The reception unit 101 is an example of a first reception unit and a second reception unit.

The storage unit 110 is a storage medium such as a hard disk drive (HDD), a solid state drive (SSD), and a memory. A storage battery database (hereinafter, referred to as a "storage battery DB") is stored in the storage unit 110.

The storage battery DB is a database in which information relating to the storage battery 30 that is a control target is registered. FIG. 3 is a diagram illustrating an example of the storage battery DB according to the first embodiment. As illustrated in FIG. 3, storage battery identification information, the current SOC, an SOC operation range, a total capacity, a storage battery operation range, and a control SOC are registered in the storage battery DB of this embodiment in correspondence with each other.

Here, in the example illustrated in FIG. 3, three storage batteries A, B, and C, which are connected to the central storage battery control device 100 in FIG. 1 and are controlled, are illustrated as an example. However, there is no limitation thereto. This is true of a plurality of other storage batteries 30.

The storage battery identification information is information for identification of the storage battery 30 that is a control target, and corresponds to, for example, a name of the storage battery, and the like. The current SOC is included in the storage battery information that is received by the reception unit 101, is a current SOC of the storage battery 30, and is registered in the storage battery DB by the reception unit 101.

The SOC operation range is a range of SOC in the case of operating the storage battery 30, and is indicated by the upper limit and the lower limit of SOC. The total capacity is an amount of power that can be output from the storage battery 30, and a unit thereof is kWh. The storage battery operation range is a range of an amount of power that corresponds to the SOC operation range. Details of the control SOC will be described later.

Returning to FIG. 2, the setting unit 102 sets and registers the storage battery identification information, the SOC operation range, the total capacity, and the storage battery operation range in the storage battery DB. The setting unit 102 carries out the registration of the plurality of pieces of information in the storage battery DB in advance on the basis of input data from a user, and the like.

The calculation unit 103 reads out the current SOC and the SOC operation range in the storage battery DB from the storage battery DB with respect to each of the plurality of storage batteries 30, and calculates the control SOC on the basis of the current SOC and the SOC operation range which are read out. The control SOC is a ratio of the current SOC in the SOC operation range. The calculation unit 103 registers the control SOC, which is calculated, in the storage battery DB. The control SOC is an example of the control amount.

Here, the reason for calculating the control SOC will be described. In the example illustrated in FIG. 3, SOC operation ranges of the storage batteries 30 which are different in characteristics are indicated. In the case of generating a charge and discharge output value of the storage batteries 30 with focus given to the control SOC, in the example in FIG. 3, the current SOC of the storage battery C is greater than the current SOC of the storage batteries A and B, and thus the amount of charge of the storage battery C is the greatest. Accordingly, the storage battery control device in the related art distributes the charge and discharge output value to the respective storage batteries A, B, and C in such a manner that the charge and discharge output value to be greatest for the storage battery C.

However, when referring to SOC operation range, the current SOC of "60%" of the storage battery C reaches the lower limit of the SOC operation range of "60% to 100%", and thus discharge cannot be carried out any more. Therefore, even when the storage battery control device provides a discharge command to the storage battery C in combination with a discharge output value, the storage battery C is less likely to operate in accordance with the command.

In addition, when comparing the SOC of the storage battery A and the current SOC of the storage battery B with each other, the current SOC is greater on a storage battery B side, and thus the storage battery B has a more margin for discharge. Accordingly, much discharge output value is distributed to the storage battery B by the storage battery control device of the related art. However, when referring to the SOC operation range, in the case of the storage battery A, the current SOC of "20%" is approximately the center of the SOC operation range of "0% to 40%", and in the case of the storage battery B, the current SOC of "30%" is closer to the lower limit of "20%" of the SOC operation range of "20% to 60%". Therefore, the storage battery A has a more margin. Accordingly, when the storage battery control device distributes a more charge and discharge output value to the storage battery A, this leading to a more efficient operation capable of utilizing the margin of the respective storage batteries to the maximum.

As described above, in the case of distributing the charge and discharge output value with reference to only the current SOC, this case may not lead to an operation with efficiency in which the margin of the storage batteries is sufficiently reflected. Therefore, in this embodiment, the calculation unit 103 makes a request for a ratio of the current SOC, which indicates where the current SOC locates in the SOC operation range, in the SOC operation range as the control SOC. The following generation unit distributes (generates) the charge and discharge output value to each of the storage batteries 30 on the basis of the control SOC. Accordingly, according to this embodiment, it is possible to realize an operation with efficiency in which the margin of the respective storage batteries 30 is sufficiently reflected.

The determination unit 104 determines whether or not the control SOC is in the SOC operation range with respect to each of the plurality of storage batteries 30.

With respect to the respective storage batteries 30 in which the control SOC is determined by the determination unit 104 to be in the SOC operation range, the generation unit 105 generates and distributes the charge and discharge output value for each of the plurality of storage batteries 30 on the basis of the control SOC that is calculated by the calculation unit 103, and the amount of charge and discharge power of the charge and discharge command which is received. The charge and discharge output value is an output value of charge and discharge, and includes a discharge output value that gives an instruction to the storage battery 30 to discharge, and a charge output value that gives an instruction to the storage battery 30 to charge. Here, the discharge output value and the charge output value are collectively called a charge and discharge output value.

The transmission unit 106 transmits the charge and discharge output value for each of the storage batteries 30, which is generated by the generation unit 105, to each of the storage batteries 30.

Figure 4:
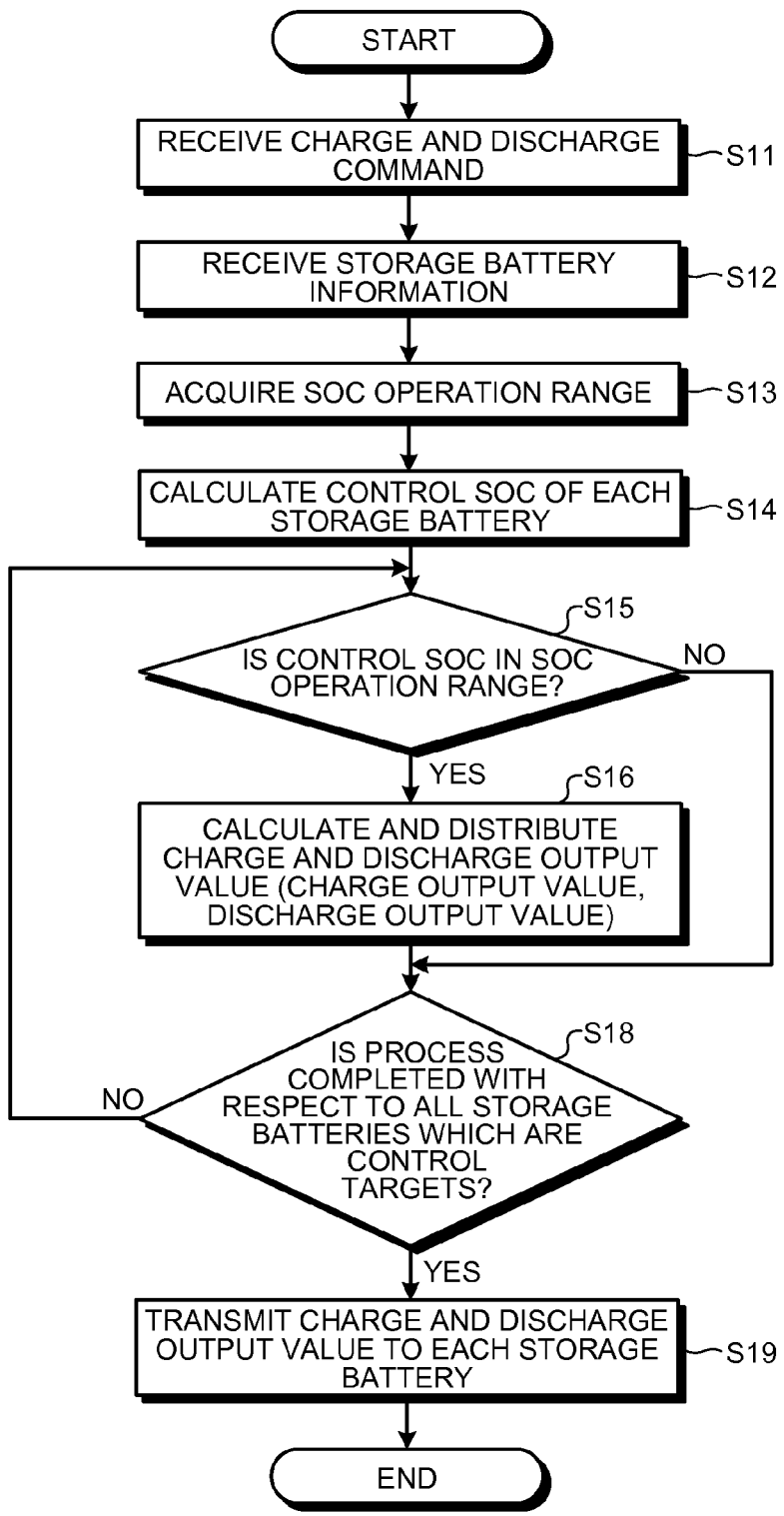
FIG. 4 is a flowchart illustrating an example of a procedure of a storage battery control process according to the first embodiment.

Description will be given of a storage battery control process of this embodiment which is configured as described above. FIG. 4 is a flowchart illustrating an example of a procedure of the storage battery control process according to the first embodiment. First, the reception unit 101 receives a charge and discharge command from the power management device 10 (S11). In addition, the reception unit 101 receives storage battery information including the current SOC from each of the plurality of storage batteries 30 (S12). The reception unit 101 acquires the current SOC from the storage battery information that is received, and registers the acquired current SOC as a current SOC, which corresponds to identification information of the storage battery 30 that is a transmission source, in the storage battery DB of the storage unit 110.

Next, the calculation unit 103 acquires the SOC operation range of each of the plurality of storage batteries 30, which are control targets, from the storage battery DB (S13). In addition, the calculation unit 103 calculates the control SOC from the SOC operation range and the current SOC which are acquired for each of the storage batteries 30 (S14).

The following processes from S15 to S18 are repeatedly carried out with respect to each of the storage batteries 30 which are control targets. First, a first storage battery 30 is selected. The determination unit 104 determines whether or not the control SOC is in the SOC operation range (S15). In addition, in a case where the control SOC is in the SOC operation range (Yes in S15), the generation unit 105 calculates the charge and discharge output value of the storage battery 30 from the amount of charge and discharge power that is designated by the charge and discharge command, and distributes the charge and discharge output value (S16). Specifically, the generation unit 105 calculates a provisional value corresponding to the control SOC from the amount of charge and discharge power, and in a case where the provisional value is equal to or less than a total rating output of the storage battery 30, the provisional value is set as the charge and discharge output value.

In a case where it is determined in S15 that the control SOC is not in the SOC operation range (No in S15), calculation of the charge and discharge output value in S16 is not carried out with respect to the storage battery 30 that is selected.

Next, the determination unit 104 determines whether or not the processes in S15 and S16 are completed with respect to all of the storage batteries 30 which are control targets (S18). In addition, in a case where the processes S15 and S16 are not completed with respect to all of the storage batteries 30 which are control targets (No in S18), the processes of S15 and S16 are repeatedly carried out.

On the other hand, in a case where the processes of S15 and S16 are completed with respect to all of the storage batteries 30 which are control targets (Yes in S18), the transmission unit 106 transmits the charge and discharge output value, which is generated by the generation unit 105, to each of the storage batteries 30 (S19).

Figures 5, 6:
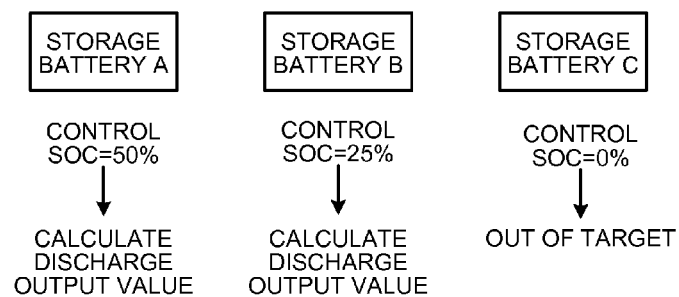
FIG. 5 is a diagram illustrating an example of a storage battery DB in a state in which control SOC is registered in the first embodiment.
FIG. 6 is a diagram illustrating an example of the case of giving a command of a discharge output value to a storage battery 30 in the first embodiment.

Hereinafter, description will be given of generation of the charge and discharge output value as an example. FIG. 5 is a diagram illustrating an example of the storage battery DB in a state in which the control SOC is registered in the first embodiment. As illustrated in FIG. 5, in the storage battery A, the current SOC of "20%" is at a half ratio position of the SOC operation range of "0% to 40%", and thus the calculation unit 103 calculates the control SOC of the storage battery A as 50%. In addition, as illustrated in FIG. 5, in the storage battery B, the current SOC of "30%" is at a quarter ratio position of the SOC operation range of "20% to 60%", and thus the calculation unit 103 calculates the control SOC of the storage battery B as 25%. In addition, as illustrated in FIG. 5, in the storage battery C, the current SOC of "60%" is at a lower limit position of the SOC operation range of "60% to 100%", and thus the calculation unit 103 calculates the control SOC of the storage battery C as 0%.

FIG. 6 is a diagram illustrating an example of the case of giving a command of a discharge output value to a storage battery 30 in the first embodiment. FIG. 6 illustrates an example corresponding to FIG. 5. As illustrated in FIGS. 5 and 6, the control SOC of the storage battery A is 50%, the control SOC of the storage battery B is 25%, and the control SOC of the storage battery C is 0%. The control SOC of the storage battery C is not in the SOC operation range, and thus the generation unit 105 excludes the storage battery C from the calculation target of the discharge output value.

In addition, according to the control SOC, the storage battery A has a margin greater than that of the storage battery B. Accordingly, the generation unit 105 calculates a discharge output value for the storage battery A which is greater than a discharge output value for the storage battery B.

Figures 7, 8:
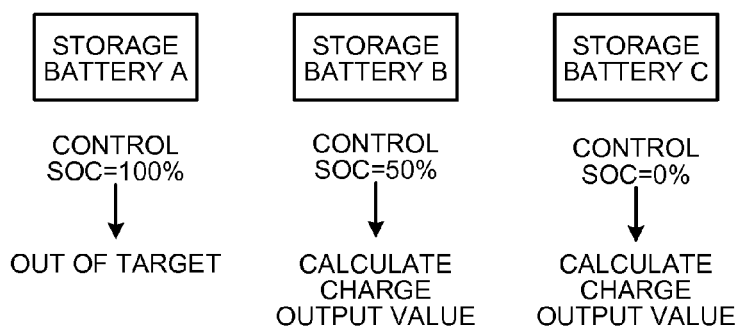
FIG. 7 is a diagram illustrating another example of the storage battery DB in a state in which the control SOC is registered in the first embodiment.
FIG. 8 is a diagram illustrating an example of the case of giving a command of a charge output value to the storage battery 30 in the first embodiment.

In addition, FIG. 7 is a diagram illustrating another example of the storage battery DB in a state in which the control SOC is registered in the first embodiment. As illustrate din FIG. 7, in the storage battery A, the current SOC of "40%" is at an upper limit position of the SOC operation range of "0% to 40%", and thus the calculation unit 103 calculates the control SOC of the storage battery A as 100%. In addition, as illustrated in FIG. 7, in the storage battery B, the current SOC of "40%" is at a half ratio position of the SOC operation range of "20% to 60%", and thus the calculation unit 103 calculates the control SOC of the storage battery B as 50%. In addition, as illustrated in FIG. 7, in the storage battery C, the current SOC of "60%" is at a lower limit position of the SOC operation range of "60% to 100%", and thus the calculation unit 103 calculates the control SOC of the storage battery C as 0%.

FIG. 8 is a diagram illustrating an example of the case of giving a command of a charge output value to the storage battery 30 in the first embodiment. FIG. 8 illustrates an example corresponding to FIG. 7. As illustrated in FIGS. 7 and 8, the control SOC of the storage battery A is 100%, the control SOC of the storage battery B is 50%, and the control SOC of the storage battery C is 0%. The control SOC of the storage battery A is not in the SOC operation range, and thus the generation unit 105 excludes the storage battery A from the calculation target of the charge output value.

In addition, according to the control SOC, the storage battery B has a margin greater than that of the storage battery C. Accordingly, the generation unit 105 calculates a charge output value for the storage battery C which is greater than a charge output value for the storage battery B.

As described above, according to this embodiment, the storage battery control device 100 acquires the control SOC, which corresponds to a position of the current SOC in the SOC operation range, for each of the storage batteries 30, carries out generation and distribution of the charge and discharge output value for each of the storage batteries 30 on the basis of the control SOC, and transmits the charge and discharge output value to the storage battery 30. Accordingly, according to this embodiment, it is possible to conduct generation and distribution of the charge and discharge output value in accordance with the margin of the storage battery 30 in which the SOC operation range is also considered. Accordingly, according to this embodiment, even when simultaneously carrying out charge and discharge control with respect to the storage batteries 30 in which operation ranges of the electricity storage state are different from each other, it is possible to carry out an efficient operation.

Second Embodiment

Figure 9:
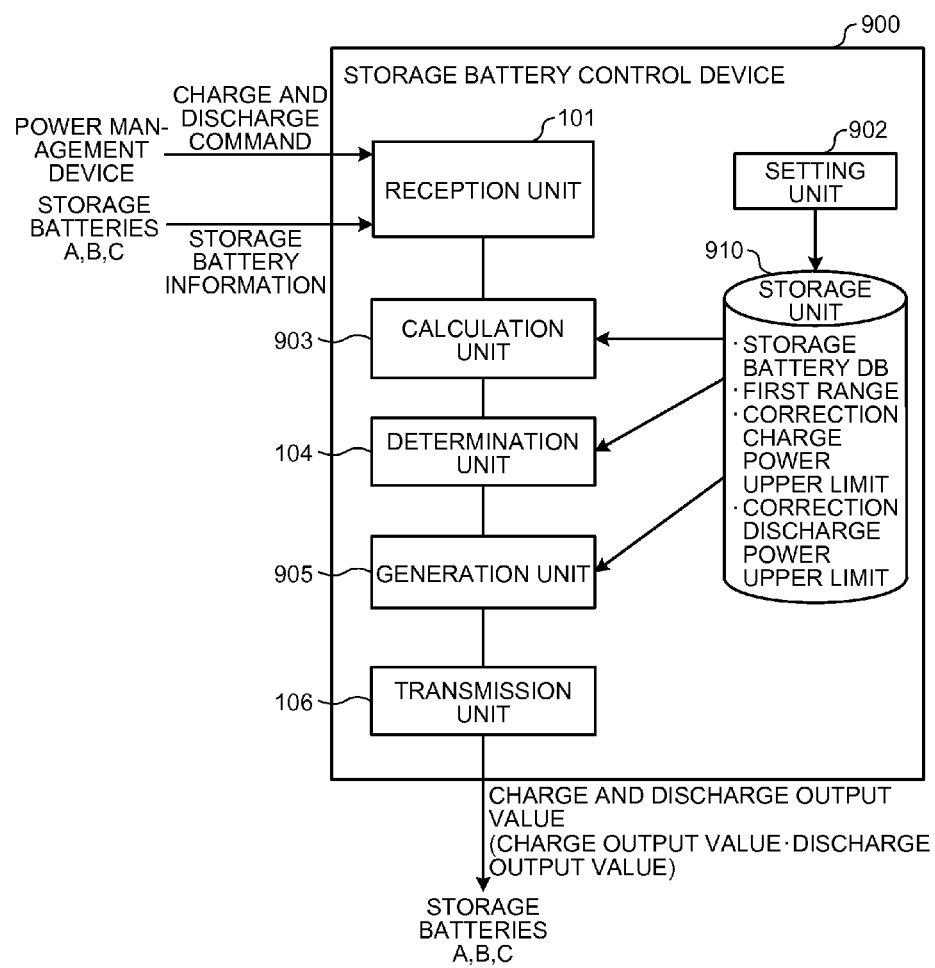
FIG. 9 is a block diagram illustrating an example of a functional configuration of a storage battery control device according to a second embodiment.

In a second embodiment, correction of the charge and discharge output value is carried out. The entire configuration of a storage battery control system in the second embodiment is the same as in the first embodiment illustrated in FIG. 1. FIG. 9 is a block diagram illustrating an example of a functional configuration of the storage battery control device according to the second embodiment.

As illustrated in FIG. 9, a storage battery control device 900 according to this embodiment mainly includes a reception unit 101, a setting unit 902, a calculation unit 903, a determination unit 104, a generation unit 905, a transmission unit 106, and a storage unit 910. Here, the function and the configuration of the reception unit 101, the determination unit 104, and the transmission unit 106 are the same as those in the first embodiment.

The storage unit 910 is a storage medium such as an HDD, an SSD, and a memory, and stores the storage battery DB similar to the first embodiment. In the second embodiment, a first range, a correction charge power upper limit value, and a correction discharge power upper limit are also stored in the storage unit 910.

The first range is an SOC range for determination of starting correction of the charge and discharge output value by the generation unit 905. The correction charge power upper limit is an upper limit during correction of the charge power value by the generation unit 905. The correction discharge power upper limit is an upper limit during correction of a discharge power value by the generation unit 905. The correction charge power upper limit and the correction discharge power upper limit are examples of a particular upper limit.

As is the case with the first embodiment, the setting unit 902 registers identification information of the storage battery, the SOC operation range, the total capacity, the storage battery operation range in the storage battery DB. In addition, the setting unit 902 registers the first range, the correction charge power upper limit, and the correction discharge power upper limit in advance. The first range, the correction charge power upper limit, and the correction discharge power upper limit can be set to any value. The setting unit 902 allows a user to directly input the SOC range, and sets the SOC range that is input in the storage unit 910 as the first range. In addition to this, it is possible to configure the setting unit 902 in such a manner that the setting unit 902 allows the user to input an output time range at a rating output, converts the output time range that is input to the SOC range, and sets the SOC range to the storage unit 910 as the first range.

As is the case with the first embodiment, the calculation unit 903 reads out the current SOC and the SOC operation range in the storage battery DB from the storage battery DB with respect to each of the plurality of storage batteries 30, and calculates the control SOC on the basis of the current SOC and the SOC operation range which are read out. In addition, the calculation unit 903 adds the control SOC of each of the plurality of storage batteries 30 to calculate a total control SOC. Here, the total control SOC is an example of the total control amount.

The generation unit 905 determines whether or not the total control SOC, which is calculated by the calculation unit 903, is out of the first range that is set in the storage unit 910, and in a case where the total control SOC is out of the first range, the generation unit 905 corrects the charge and discharge output value that is corrected. Specifically, in a case where the total control SOC is greater than the upper limit of the first range, the generation unit 905 determines that the storage battery 30 is to be corrected in a discharge direction (correction discharge), and generates a discharge output value that is corrected. In addition, in a case where the total control SOC is less than the lower limit of the first range, the generation unit 905 determines that the storage battery 30 is to be corrected in a charge direction (correction charge), and generates a charge output value that is corrected.

In a case where the total control SOC is out of the first range, the generation unit 905 determines whether or not the correction can be continuously carried out, and in a case where it is determined that the correction can be continuously carried out, the generation unit 905 corrects the charge and discharge output value. Here, with regard to whether or not the correction can be continuously carried out, the generation unit 905 determines whether or not the storage battery 30 is out of order by using SOC of the storage battery information that is received by the reception unit 101, and in a case where the storage battery 30 is out of order, the generation unit 905 determines that the correction cannot be continuously carried out, and in a case where the storage battery 30 is not out of order, the generation unit 905 determines that the correction can be continuously carried out. In addition, the generation unit 905 corrects the charge power value in a range that is equal to or less than the correction charge power upper limit. The generation unit 905 corrects the discharge power value in a range that is equal to or less than the correction discharge power upper limit.

Figure 10:
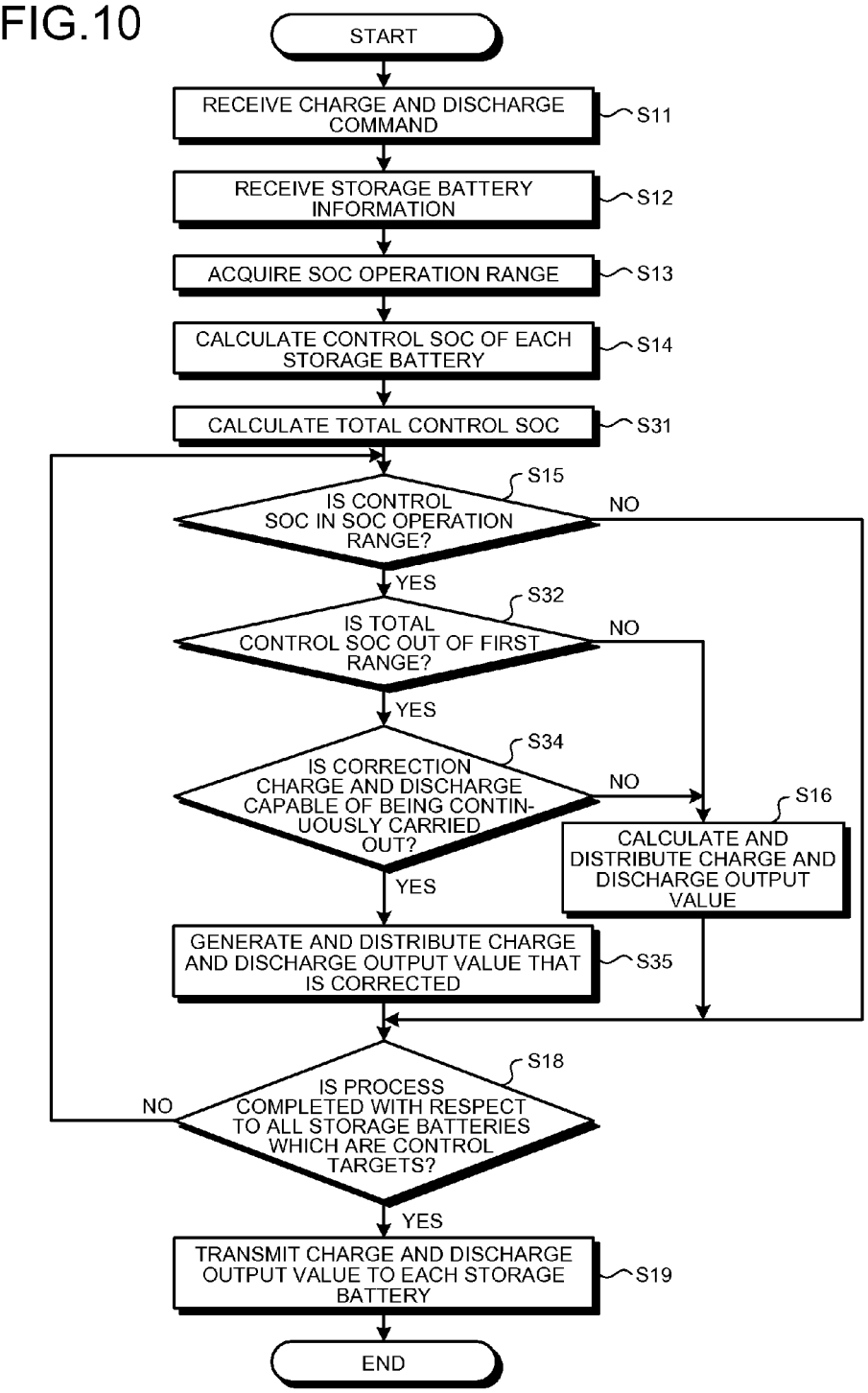
FIG. 10 is a flowchart illustrating an example of a procedure of a storage battery control process according to the second embodiment.

Description will be given of a storage battery control process according to the second embodiment which is configured as described above. FIG. 10 is a flowchart illustrating an example of a procedure of the storage battery control process according to the second embodiment. Processes from S11 to S14 are the same as in the first embodiment. The calculation unit 903 calculates the control SOC of all of the storage batteries 30 which are control targets, and then adds the control SOC of each of the storage batteries 30 to calculate a total control SOC (S31).

The following processes from S15 to S18 are repeatedly carried out for each of the storage batteries 30 which are control targets. First, a first storage battery 30 is selected. The determination unit 104 determines whether or not the control SOC is in the SOC operation range (S15). In addition, in a case where the control SOC is not in the SOC operation range (No in S15), the process shifts to S18. In a case where the control SOC is in the SOC operation range (Yes in S15), the generation unit 905 determines whether or not the total control SOC is out of a first range (S32).

In addition, in a case where the total control SOC is out of the first range (Yes in S32), the generation unit 905 determines whether or not correction charge and discharge can be continuously carried out (S34). In addition, in a case where it is determined that the correction charge and discharge can be continuously carried out (Yes in S34), the generation unit 905 calculates a charge and discharge output value of the storage battery 30, which is corrected, from the amount of charge and discharge power that is designated by the charge and discharge command, and distributes the charge and discharge output value (S35). That is, in a case where the total control SOC exceeds the upper limit of the first range, the generation unit 905 determines that the correction discharge is to be carried out, and generates and distributes the discharge output value that is corrected. In addition, in a case where the total control SOC is less than the lower limit of the first range, the generation unit 905 determines that the correction charge is to be carried out, and generates and distributes the charge output value that is corrected. In addition, the process shifts to S18.

In a case where it is determined in S32 that the total control SOC is not out of the first range (No in S32), the correction process in S35 is not carried out. In this case, the generation unit 905 calculates the charge and discharge output value of the storage battery 30 from the amount of charge and discharge power that is designated by the charge and discharge command, and distributes the charge and discharge output value (S16). In addition, the process shifts to S18 without correction.

In addition, even in a case where it is determined in S34 that the correction charge and discharge cannot be continuously carried out (No in S34), the correction process in S35 is not carried out, and the generation unit 905 calculates the charge and discharge output value of the storage battery 30 from the amount of charge and discharge power that is designated by the charge and discharge command, and distributes the charge and discharge output value (S16). In addition, the process shifts to S18.

In S18, as is the case with the first embodiment, the determination unit 104 determines whether or not the process from S15 to S35 is completed with respect to all of the storage batteries 30 which are control targets (S18). In addition, in a case where the processes from S15 to S35 with respect to all of the storage batteries 30 which are control targets are not completed (No in S18), the processes from S15 to S35 are repeatedly carried out.

On the other hand, in a case where the processes from S15 to S35 are completed with respect to all of the storage batteries 30 which are control targets (Yes in S18), the transmission unit 106 transmits the charge and discharge output value, which is generated by the generation unit 105, to each of the storage batteries 30 (S19).

Description will be given of a specific example of calculating the charge and discharge output value that is corrected. First, description will be given of the correction charge. It is assumed that the charge and discharge command from the power management device 10 is a charge command, and the amount of charge power instructed by the charge command is 100 kW, and 50 kW, 30 kW, and 20 kW are distributed to three storage batteries A, B, and C on the basis of each control SOC. At this time, when a correction charge power upper limit is set to 30 kW, with regard to the charge output value that is corrected, the generation unit 905 generates 70 kW obtained by subtracting 30 kW from 100 kW, which is the amount of charge power of the charge command, as the charge output value that is corrected. The generation unit 905 distributes the charge output value of 70 kW, which is corrected, to the three storage batteries A, B, and C, for example, like 40 kW, 20 kW, and 10 kW on the basis of each control SOC.

Next, description will be given of the correction discharge. It is assumed that the charge and discharge command from the power management device 10 is a discharge command, and the amount of discharge power instructed by the discharge command is 100 kW, and for example, 50 kW, 30 kW, and 20 kW are distributed to the three storage batteries A, B, and C on the basis of each control SOC. At this time, when a correction discharge power upper limit is set to 20 kW, with regard to the discharge output value that is corrected, the generation unit 905 generates 120 kW obtained by adding 20 kW to 100 kW, which is the amount of discharge power of the discharge command, as the discharge output value that is corrected. The generation unit 905 distributes the discharge output value of 120 kW, which is corrected, to the three storage batteries A, B, and C, for example, like 50 kW, 40 kW, and 30 kW on the basis of each control SOC.

As described in this example, the calculation unit 903 calculates the total control SOC obtained by adding the control SOC of the plurality of storage batteries 30, and in a case where the total control SOC is out of the first range, the generation unit 905 generates the charge and discharge output value that is corrected. Accordingly, according to this embodiment, even in a case where storage batteries in which the operation ranges of the electricity storage state are different from each other are simultaneously subjected to charge and discharge control, it is possible to carry out an efficient operation in a more accurate manner.

In addition, in this example, the generation unit 905 generates the charge and discharge output value, which is corrected, on the basis of the correction charge power upper limit and the correction discharge power upper limit. Accordingly, according to this embodiment, there is no adverse effect on a variation in demand, and thus it is possible to carry out the correction charge and the correction discharge of the storage battery 30.

That is, in this example, in the case of the correction charge, the generation unit 905 generates the charge output value, which is corrected, by subtracting the correction charge power upper limit from the amount of charge power of the charge command. On the other hand, in the case of the correction discharge, the generation unit 905 generates the discharge output value, which is corrected, by adding the correction discharge power upper limit to the amount of discharge power of the discharge command. Accordingly, in this example, the charge and discharge power value, which is corrected and is generated for correction of SOC of the storage battery 30 in a charge direction or a discharge direction, does not extremely increase. Accordingly, according to this embodiment, it is possible to avoid a problem in which the charge power value of any one of storage batteries 30, which is corrected, is greater than the amount of discharge power instructed by the discharge command (raising command) to another power generator or storage battery 30, and the storage battery 30 is subjected to the correction charge, thereby leading to a lowering command with regard to the entirety of the power system.

In addition, in this example, the calculation unit 903 calculates the total control SOC obtained by adding the control SOC of each of the plurality of storage batteries 30, and the generation unit 905 determines whether or not the total control SOC is in the first range for determination of whether or not the correction charge and the correction discharge are necessary to be carried out. Accordingly, in this example, the storage battery control device 100 does not grasp a current state of the storage battery 30 for each storage battery, and collectively grasps the state of the entirety of the storage batteries 30 under management of the storage battery control device 100, and thus it is possible to carry out the correction charge or the correction discharge of the storage battery 30.

According to this embodiment, the plurality of storage batteries 30 do not simultaneously initiate the correction charge or the correction discharge at a moment at which a system frequency reaches in a constant range, and the like, and thus it is possible to prevent a situation in which carrying out and stoppage of the correction charge or the correction discharge repetitively occur. Accordingly, according to this embodiment, the correction charge and the correction discharge of the storage battery 30 are carried out from a viewpoint which takes much into account, and thus system stabilization control does not become complex. As a result, according to this embodiment, the correction charge and the correction discharge of the storage battery 30 do not cause a frequency variation, and the charge and discharge control by the storage battery 30 can contribute to stabilization of the power system 20.

Third Embodiment

In a third embodiment, a plurality of the SOC operation ranges are set for each storage battery 30, and the storage battery control device selects one SOC range from the plurality of SOC operation ranges, and generates the charge and discharge power value.

Figure 11:
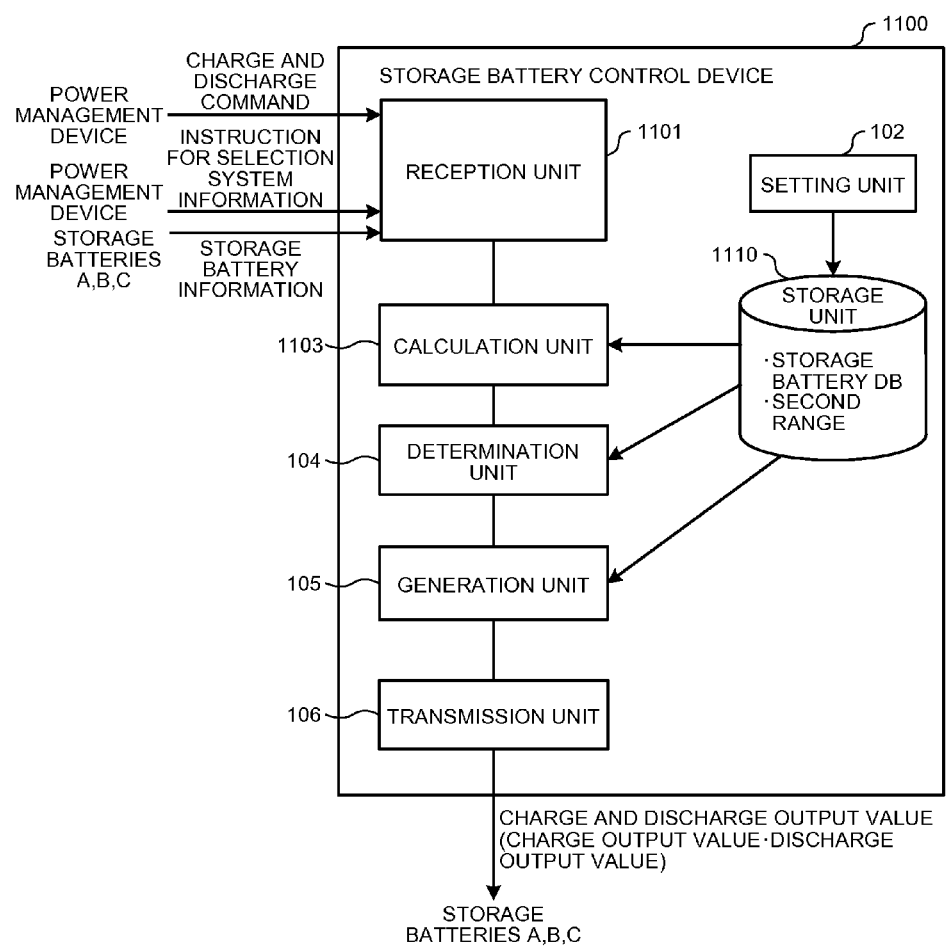
FIG. 11 is a block diagram illustrating an example of a functional configuration of a storage battery control device according to third embodiment.

FIG. 11 is a block diagram illustrating an example of a function configuration of the storage battery control device according to the third embodiment. As illustrated in FIG. 11, a storage battery control device 1100 according to this embodiment mainly includes a reception unit 1101, a setting unit 102, a calculation unit 1103, a determination unit 104, a generation unit 105, a transmission unit 106, and a storage unit 1110. Here, the function and the configuration of the setting unit 102, the determination unit 104, the generation unit 105, and the transmission unit 106 are the same as those in the first embodiment.

The storage unit 1110 is a storage medium such as an HDD, an SSD, and a memory. The storage battery DB and a second range are stored in the storage unit 1110. The second range is a range for determined of whether or not the following system information is in a specified range. The second range is set by the setting unit 102.

In the storage battery DB of this embodiment, the plurality of SOC operation ranges are set for each storage battery 30. FIG. 12 is a diagram illustrating an example of the storage battery DB according to the third embodiment. (a) of FIG. 12 illustrates an example of the storage battery DB before calculation of the control SOC, and (b) of FIG. 12 illustrates an example of the storage battery DB after calculation of the control SOC.

As illustrated in (a) and (b) of FIG. 12, the plurality of SOC operation ranges are determined for each of the plurality of storage batteries 30. The plurality of SOC operation ranges, which are determined, include an SOC operation range of a normal operation, an SOC operation range of an emergency operation, an SOC operation range of an economical operation, and the like. Here, the SOC operation range of the normal operation is an SOC operation range of the storage battery 30 that is applied during a normal operation of the storage battery 30. The SOC operation range of the emergency operation is an SOC operation range that is applied during an operation of the storage battery 30 in a case where it is necessary to output at the sacrifice of charge and discharge efficiency in case of emergency. The SOC operation range of the economical operation is an SOC operation range that is applied during an operation of the storage battery 30 in a case where it is necessary to consider the charge and discharge efficiency to the maximum. However, the plurality of SOC operation ranges are not limited thereto. For example, an SOC operation range during a load frequency control operation may be determined.

As is the case with the first embodiment, the reception unit 1101 receives a charge and discharge command from the power management device 10, and receives storage battery information from the storage battery 30. In addition, the reception unit 1101 in this embodiment further receives an instruction for selection of the SOC operation range from the power management device 10. The instruction for selection of the SOC operation range is an instruction for selection of which SOC operation range for each of the storage batteries 30.

In addition, the reception unit 1101 receives system information from the power system 20 or the power management device 10. The system information is information relating to a state of the power system 20, and examples thereof include a system frequency, a bus line voltage, a main line power flow, and the like. However, the system information is not limited thereto as long as the state of the power system 20 is indicated.

The calculation unit 1103 calculates the control SOC with respect to each of the plurality of storage batteries 30 on the basis of the current SOC, and the SOC operation range that is designated by the instruction for selection. In addition, the calculation unit 1103 determines whether or not the system information received by the reception unit 1101 is out of the second range. In a case where the system information is out of the second range, the calculation unit 1103 selects the SOC operation range of the emergency operation among the plurality of SOC operation ranges, and calculates the control SOC with respect to each of the plurality of storage batteries 30 on the basis of the current SOC and the SOC operation range of the emergency operation which is selected.

Figure 13:
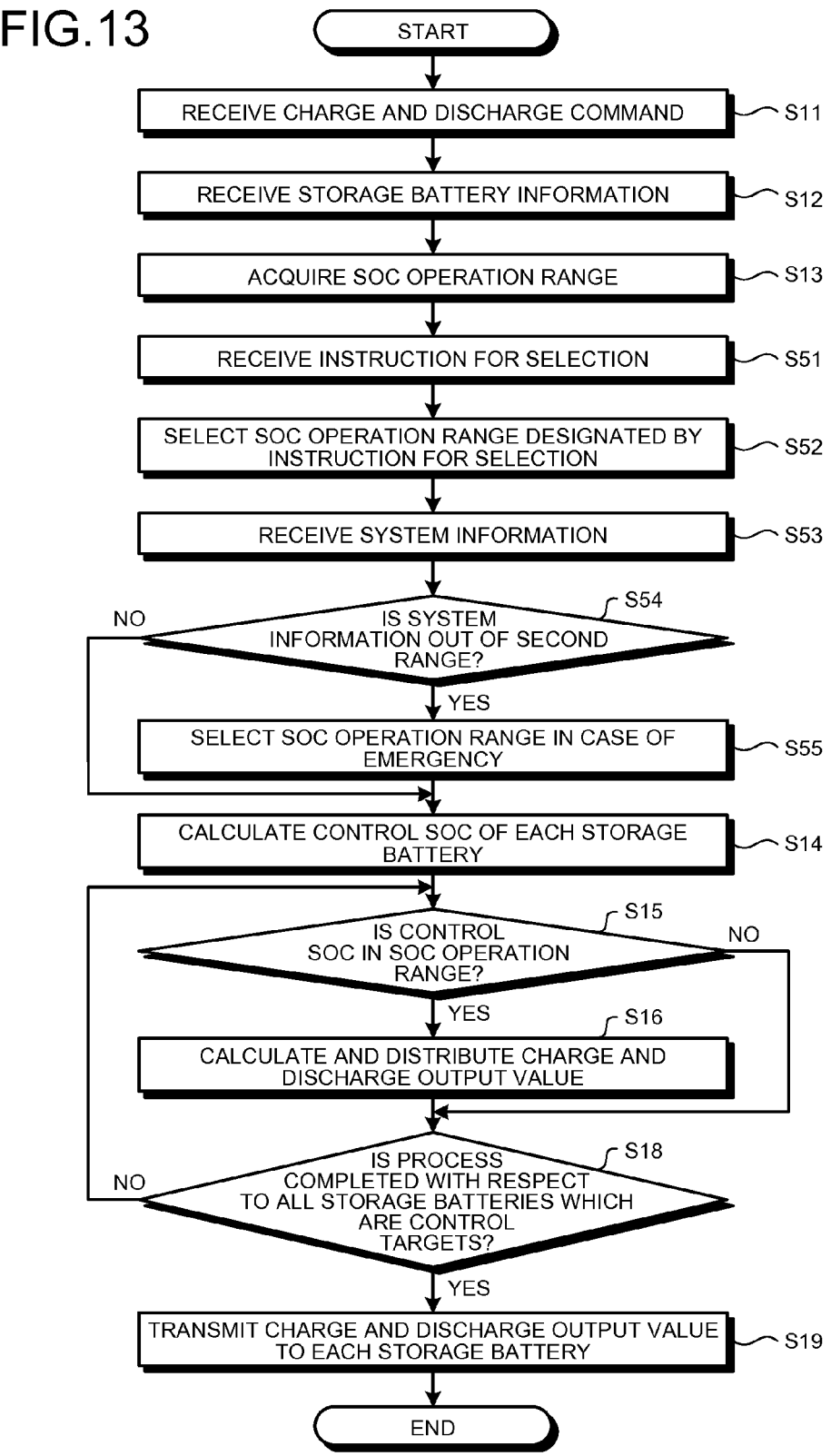
FIG. 13 is a flowchart illustrating an example of a procedure of a storage battery control process according to the third embodiment.

Description will be given of a storage battery control process according to the third embodiment which is configured as described above. FIG. 13 is a flowchart illustrating an example of a procedure of the storage battery control process according to the third embodiment. Processes from S11 to S13 are the same as in the first embodiment.

In addition, the reception unit 1101 receives an instruction for selection of the SOC operation range from the power management device 10 (S51). Next, the calculation unit 1103 selects the storage battery 30 that is designated by the instruction for selection which is received, and the SOC operation range that is instructed for selection with respect to the storage battery (S52).

Next, the reception unit 1101 receives system information from the power system 20 or the power management device 10 (S53). The calculation unit 1103 determines whether or not the system information that is received is out of the second range (S54). In addition, in a case where the system information is out of the second range (Yes in S54), the calculation unit 1103 selects the SOC operation range during the emergency operation with respect to all of the storage batteries 30 (S55). On the other hand, in a case where the system information is not out of the second range (No in S54), the selection of the SOC operation range during the emergency operation in S55 is not carried out.

In addition, the calculation unit 1103 calculates the control SOC for each of the storage batteries 30 on the basis of the SOC operation range that is selected, and the current SOC (S14). The subsequent processes are the same as in the first embodiment.

As described above, in this example, the plurality of SOC operation ranges are set, and the calculation unit 1103 selects the SOC operation range in accordance with the instruction for selection and the system information, thereby calculating the control SOC. Accordingly, in this example, it is possible to select the plurality of SOC operation ranges in accordance with the operation types such as in case of emergency, during a normal operation, during an economical operation, a load frequency control operation, and the like in a switchable manner, and thus it is possible to operate the storage battery control system in a more flexible manner.

Fourth Embodiment

Figures 14, 15:
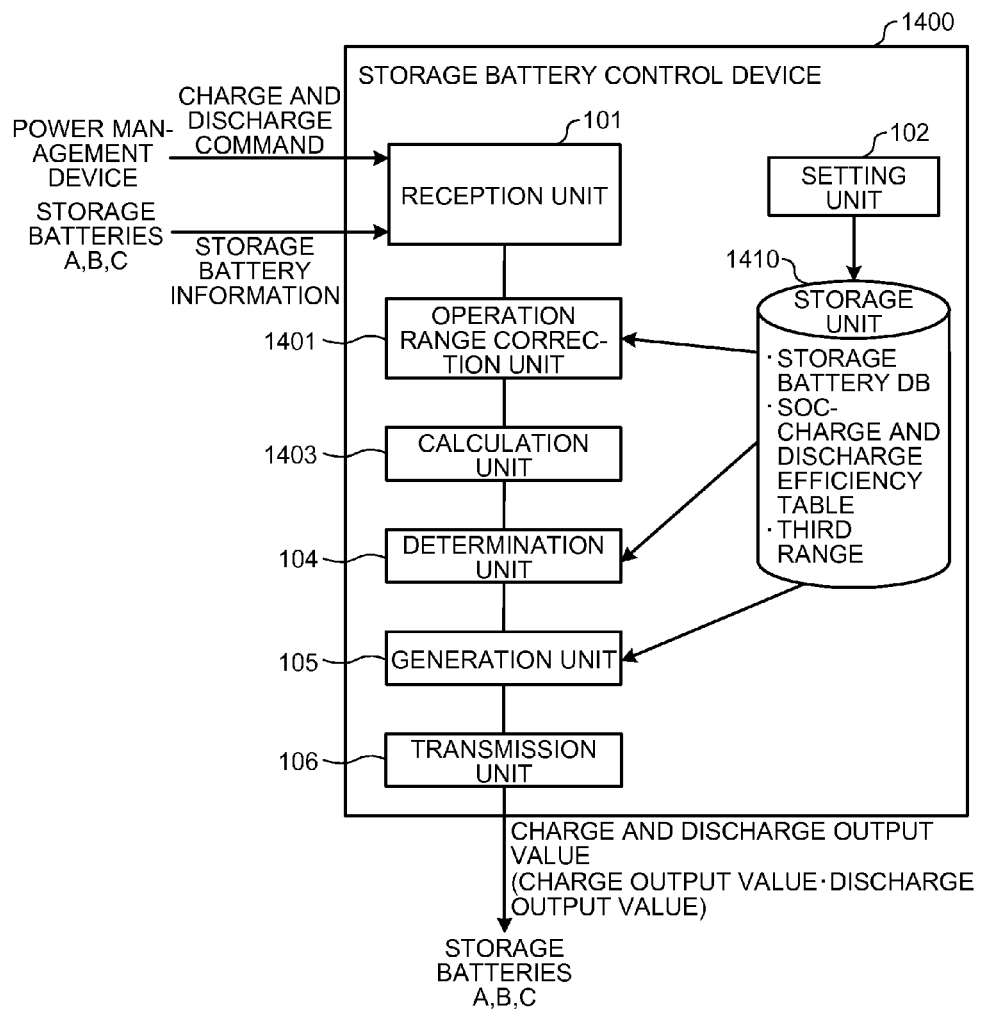
FIG. 14 is a block diagram illustrating an example of a functional configuration of a storage battery control device according to a fourth embodiment.
FIG. 15 is a diagram illustrating an example of an SOC-charge and discharge efficiency table according to the fourth embodiment.

In a fourth embodiment, the SOC operation range is corrected. FIG. 14 is a block diagram illustrating an example of a function configuration of a storage battery control device according to the fourth embodiment. As illustrated in FIG. 14, a storage battery control device 1400 according to this embodiment mainly includes a reception unit 101, a setting unit 102, an operation range correction unit 1401, a calculation unit 1403, a determination unit 104, a generation unit 105, a transmission unit 106, and a storage unit 1410. Here, the function and the configuration of the reception unit 101, the setting unit 102, the determination unit 104, the generation unit 105, and the transmission unit 106 are the same as those in the first embodiment.

The storage unit 1410 is a storage medium such as an HDD, an SSD, and a memory. As is the case with the first embodiment, in addition to the storage battery DB that is retained, an SOC-charge and discharge efficiency table, and a third range are stored in the storage unit 1410. The third range is a value that can be used for the following determination of charge and discharge efficiency. The third range is set by the setting unit 102.

The SOC-charge and discharge efficiency table is a table in which a relationship between SOC and the charge and discharge efficiency is determined, and is set in advance by the setting unit 102 in accordance with statistics. FIG. 15 is a diagram illustrating an example of the SOC-charge and discharge efficiency table of the fourth embodiment. As illustrated in FIG. 15, in the SOC-charge and discharge efficiency table, the SOC and the charge and discharge efficiency are registered in correspondence with each other.

The operation range correction unit 1401 calculates the charge and discharge efficiency from the current SOC in the storage battery information that is received by the reception unit 101. Specifically, the operation range correction unit 1401 refers to the SOC-charge and discharge efficiency table, and acquires charge and discharge efficiency corresponding to the current SOC. In addition, the operation range correction unit 1401 calculates charge and discharge efficiency at the upper limit and the lower limit of the SOC operation range from the charge and discharge efficiency that is obtained, and determines whether or not the charge and discharge efficiency that is calculated is out of the third range. In a case where the charge and discharge efficiency that is calculated is out of the third range, the operation range correction unit 1401 corrects the SOC operation range in order for the charge and discharge efficiency that is calculated to be in the third range.

Figure 16:
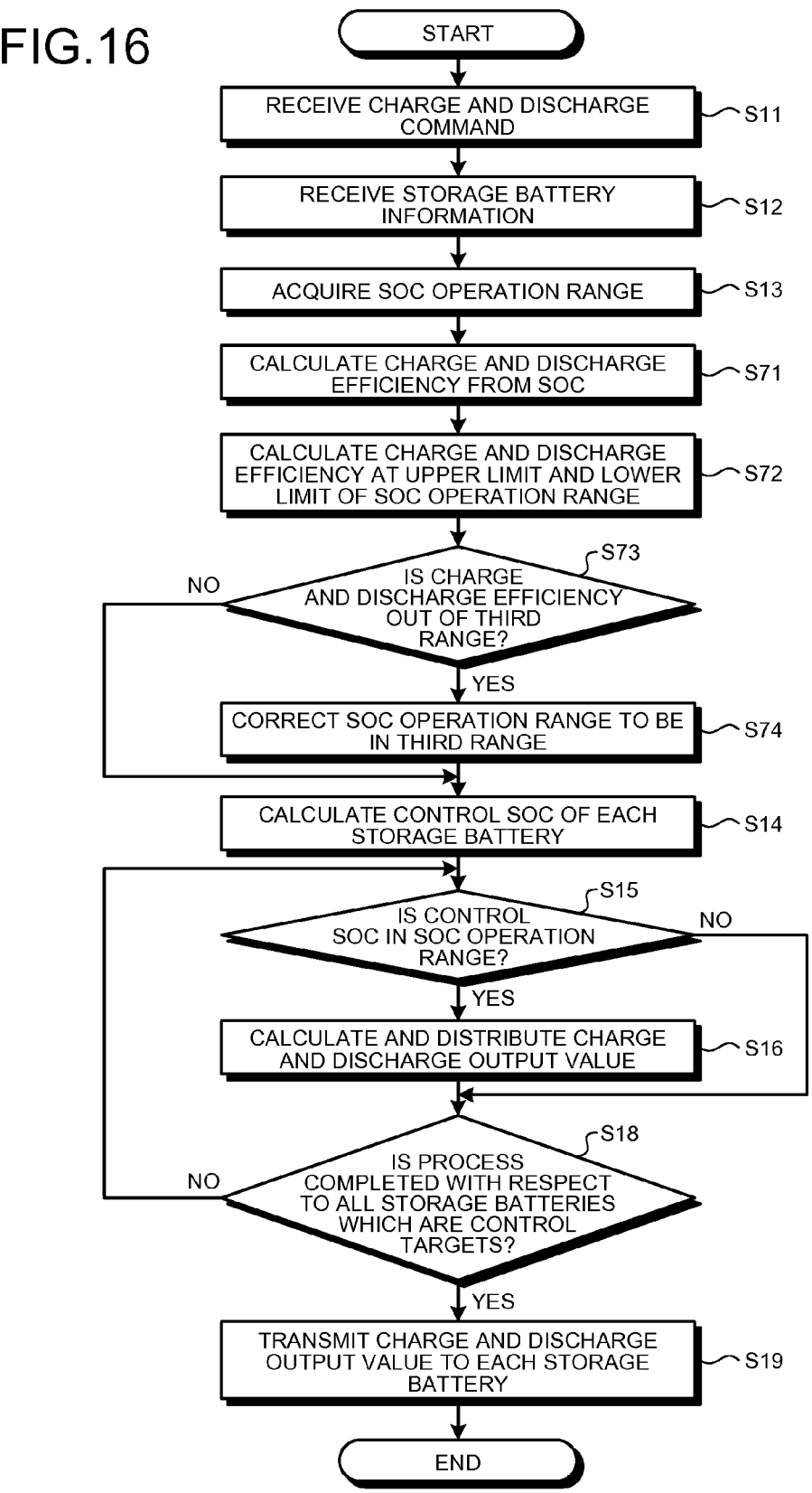
FIG. 16 is a flowchart illustrating an example of a procedure of a storage battery control process according to the fourth embodiment.

Description will be given of a storage battery control process according to the fourth embodiment which is configured as described above. FIG. 16 is a flowchart illustrating an example of a procedure of the storage battery control process according to the fourth embodiment. Processes from S11 to S13 are the same as in the first embodiment.

Next, the SOC operation range correction unit 1401 refers to the SOC-charge and discharge efficiency table, and calculates charge and discharge efficiency corresponding to the current SOC (S71). Next, the operation range correction unit 1401 calculates charge and discharge efficiency at the upper limit and the lower limit of the SOC operation range from the charge and discharge efficiency that is obtained (S72). The SOC operation range correction unit 1401 determines whether or not the charge and discharge efficiency, which is calculated in S72, is out of the third range (S73).

In addition, in a case where the charge and discharge efficiency that is calculated is out of the third range (Yes in S73), the operation range correction unit 1401 corrects the SOC operation range in order for the charge and discharge efficiency that is calculated to be in the third range (S74). On the other hand, in a case where it is determined in S73 that the calculated charge and discharge efficiency is not out of the third range (No in S73), the correction of the SOC operation range is not carried out.

In addition, the calculation unit 1403 calculates the control SOC by using the SOC operation range for each of the storage batteries 30 (S14). The subsequent processes are the same as in the first embodiment.

As described above, in this example, the operation range correction unit 1401 calculates the charge and discharge efficiency from the current SOC in the storage battery information that is received by the reception unit 101, and calculates the charge and discharge efficiency at the upper limit and the lower limit of the SOC operation range. In a case where the charge and discharge efficiency that is calculated is out of the third range, the operation range correction unit 1401 corrects the SOC operation range in order for the charge and discharge efficiency that is calculated to be in the third range. Accordingly, according to this embodiment, even when a variation in characteristics of the storage battery 30 occurs due to deterioration with the passage of time, and the like, it is possible to carry out charge and discharge control of the storage battery 30 in correspondence with the variation in the characteristics.

The storage battery control devices 100, 900, 1100, and 1400 of the above-described embodiments include a control device such as a CPU, a storage device such as a read only memory (ROM) and a ramdom access memory (RAM), an external storage device such as an HDD and a CD drive, a display device such as a display device, and an input device such as a keyboard and a mouse, and thus has a hardware configuration using a computer.

The storage battery control process, which is executed by the storage battery control devices 100, 900, 1100, and 1400 of the above-described embodiments, may be realized by software, or may be realized by hardware such as an electronic circuit.

In the case of realizing the storage battery control process, which is executed by the storage battery control devices 100, 900, 1100, and 1400 of the above-described embodiment, by software, a storage battery control program, which is executed by the storage battery control devices 100, 900, 1100, and 1400 of the above-described embodiments, is recorded in a computer readable recording medium such as a CD-ROM, an FD (flexible disk), a CD-R, and a digital versatile disk (DVD) as a file in an installation type or execution type, and is provided as a computer program product.

In addition, the storage battery control program, which is executed by the storage battery control devices 100, 900, 1100, and 1400 of the above-described embodiments, may be configured to be stored in a computer that is connected to a network such as the Internet, and to be downloaded for provision as a computer program product through the network. In addition, the storage battery program, which is executed by the storage battery control devices 100, 900, 1100, and 1400 of the above-described embodiments, may be configured to be provided and distributed as a computer program product through a network such as the Internet.

In addition, the storage battery control program, which is executed by the storage battery control devices 100, 900, 1100, and 1400 of the above-described embodiments, may be configured to be incorporated with a ROM and the like in advance and to be provided as a computer program product.

The storage battery control program, which is executed by the storage battery control devices 100, 900, 1100, and 1400 of the above-described embodiments, has a module configuration including the above-described respective units (the reception unit, the setting unit, the calculation unit, the determination unit, the generation unit, the transmission unit, and the operation range correction unit). When as actual hardware, a CPU (processor) reads out the storage battery control program from the storage medium, and executes the storage battery program, the respective units are loaded on the RAM, and thus the reception unit, the setting unit, the calculation unit, the determination unit, the generation unit, the transmission unit, and the SOC operation range correction unit are generated on the RAM.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage battery control device, comprising:
    a first reception unit that receives a charge and discharge command from a power management device;
    a second reception unit that receives a current electricity storage state from each of a plurality of storage batteries;
    a calculation unit that calculates a control amount, which indicates a ratio of the current electricity storage state in an operation range which is a range of an amount of power that corresponds to a range of an electricity storage state in a case of operating the storage battery, with respect to each of the plurality of storage batteries on the basis of the current electricity storage state and the operation range of the electricity storage state;
    a determination unit that determines whether or not the control amount is in the operation range with respect to each of the plurality of storage batteries;
    a generation unit that excludes a storage battery of which the control amount is determined as out of the operation range by the determination unit, and generates a charge and discharge output value, which is an output value of charge and discharge for each of residual storage batteries of which the control amount is determined as in the operation range by the determination unit on the basis of the control amount that is calculated for each of the residual storage batteries, and the charge and discharge command that is received from the power management device; and a transmission unit that transmits the charge and discharge output value to each of the residual storage batteries, the charge and discharge output value being generated by the generation unit.

2. The storage battery control device according to claim 1, wherein the calculation unit further calculates a total control amount by adding the control amount of each of the residual storage batteries, and the generation unit determines whether or not the total control amount is out of a first range, and generates the charge and discharge output value, which is corrected, in a case where the total control amount is out of the first range.

3. The storage battery control device according to claim 2, wherein the generation unit corrects the charge and discharge output value in a range that is equal to or less than a particular upper limit.

4. The storage battery control device according to claim 2, wherein the generation unit further determines whether or not continuous execution of the correction is allowable in a case where the total control amount is out of the first range, and generates the charge and discharge output value, which is corrected, in a case where the continuous execution of the correction is determined to be allowable.

5. The storage battery control device according to claim 2, wherein the generation unit generates a discharge output value, which is corrected, in a case where the total control amount exceeds the upper limit of the first range, and generates a charge output value, which is corrected, in a case where the total control amount is less than the lower limit of the first range.

6. The storage battery control device according to claim 1, wherein the operation range includes a plurality of operation ranges, the plurality of operation ranges are determined with respect to each of the plurality of storage batteries, the first reception unit further receives an instruction for selection of the operation range from the power management device, and the calculation unit calculates the control amount with respect to each of the residual storage batteries on the basis of the current electricity storage state and the operation range that is designated by the instruction for selection.

7. The storage battery control device according to claim 6, wherein an operation range of a normal operation and an operation range of an emergency operation are determined in the plurality of operation ranges, the first reception unit further receives system information relating to a state of a power system, and the calculation unit selects the operation range of the emergency operation in a case where the system information received by the first reception unit is out of a second range, and calculates the control amount with respect to each of the residual storage batteries on the basis of the current electricity storage state and the selected operation range of the emergency operation.

8. The storage battery control device according to claim 1, further comprising:

an operation range correction unit that calculates charge and discharge efficiency corresponding to each of the upper limit and the lower limit of the electricity storage state which are indicated by the operation range, determines whether or not the charge and discharge efficiency that is calculated is out of a third range, and corrects the operation range in order for the calculated charge and discharge efficiency to be in the third range in a case where the calculated charge and discharge efficiency is out of the third range.

9. The storage battery control device according to claim 1, further comprising:

a setting unit that sets the operation range for each of the plurality of storage batteries.

10. A storage battery control method, executed by a storage battery control device, the method comprising:

receiving a charge and discharge command from a power management device;

receiving a current electricity storage state from each of a plurality of storage batteries;

calculating a control amount, which indicates a ratio of the current electricity storage state in an operation range which is a range of an amount of power that corresponds to a range of an electricity storage state in a case of operating the storage battery, with respect to each of the plurality of storage batteries on the basis of the current electricity storage state and the operation range of the electricity storage state;

determining whether or not the control amount is in the operation range with respect to each of the plurality of storage batteries;

excluding one or more storage batteries each of which the control amount is determined as out of the operation range, and generating a charge and discharge output value, which is an output value of charge and discharge for each of residual storage batteries of which the control amount is determined as in the operation range on the basis of the control amount calculated for each of the residual storage batteries and the received charge and discharge command; and transmitting the generated charge and discharge output value to each of the residual storage batteries.

* * * * *